United States Patent Office 3,368,880
Patented Feb. 13, 1968

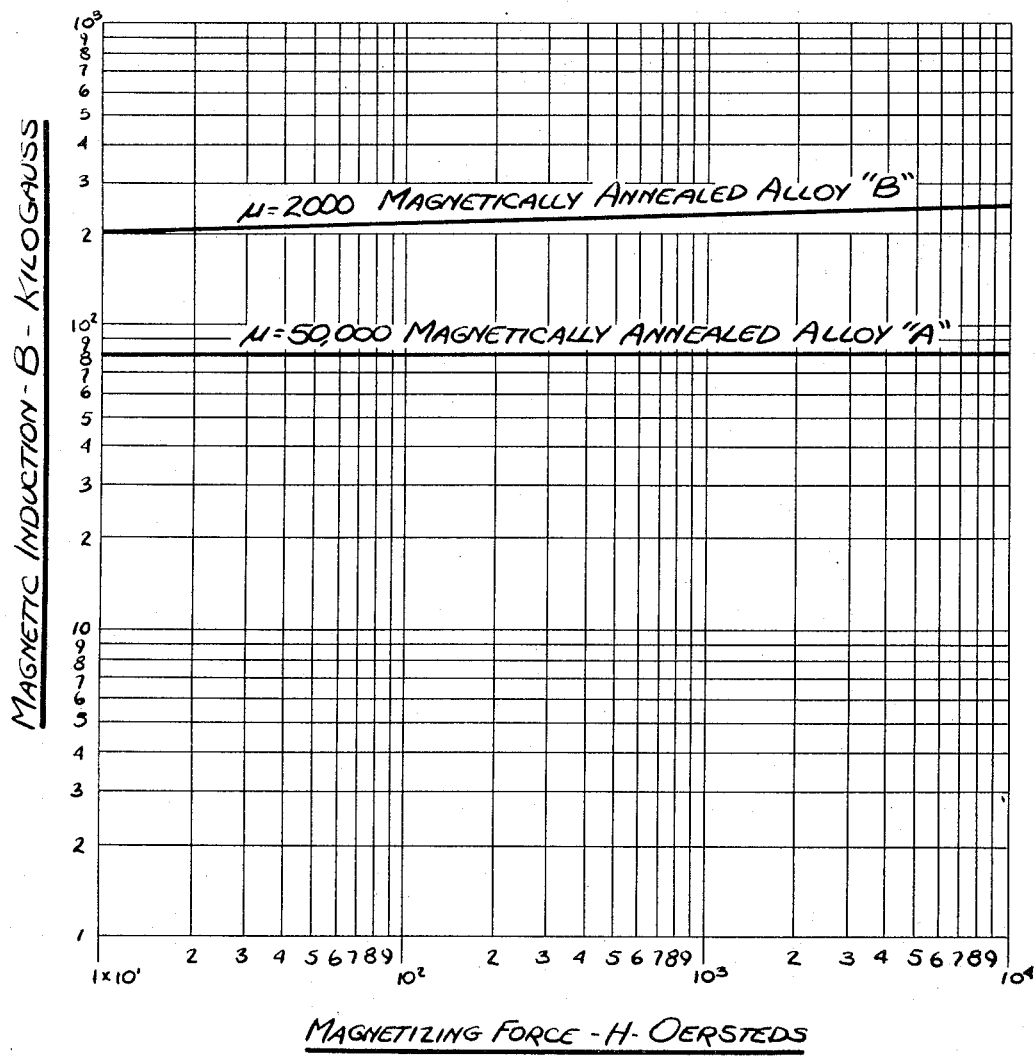

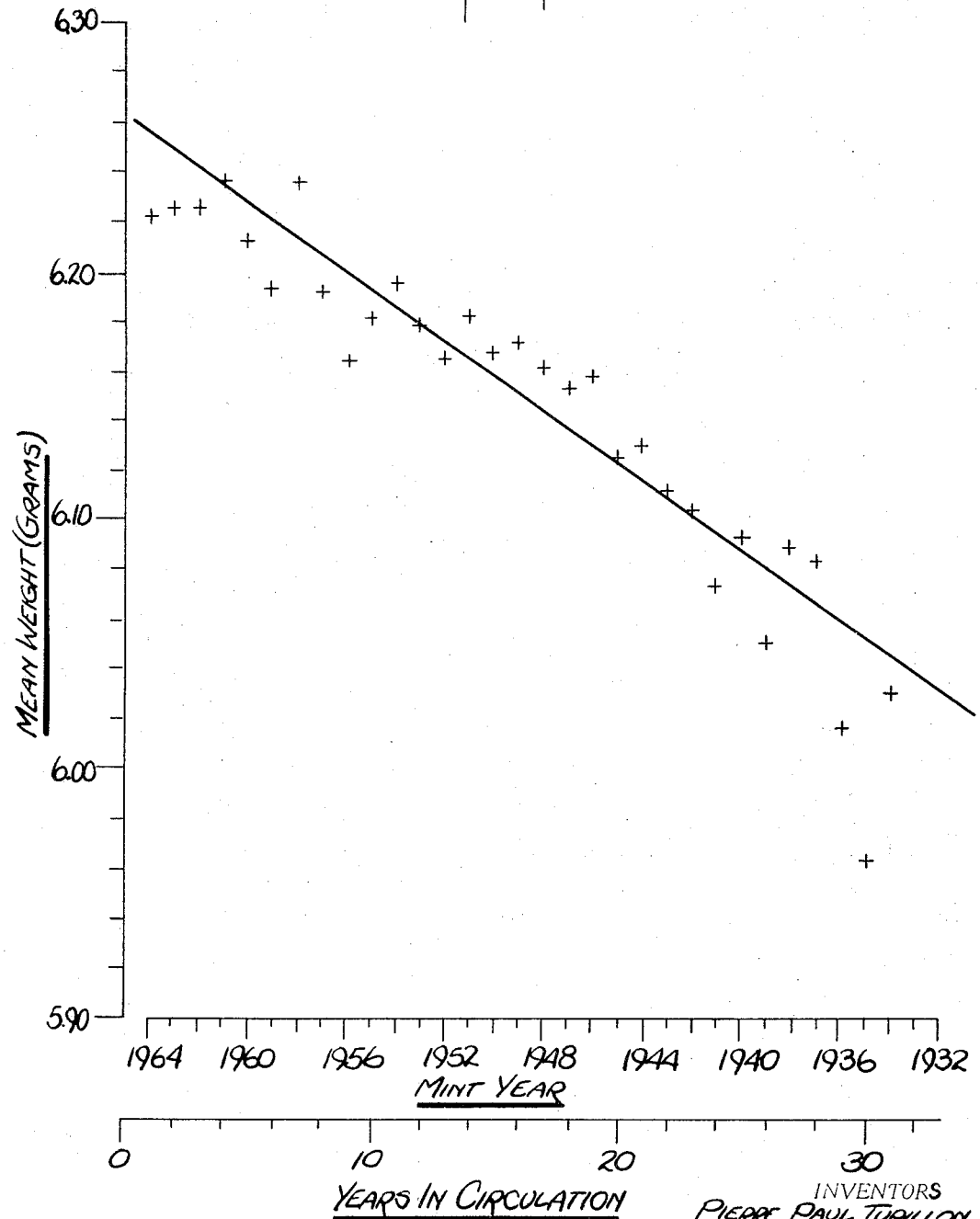

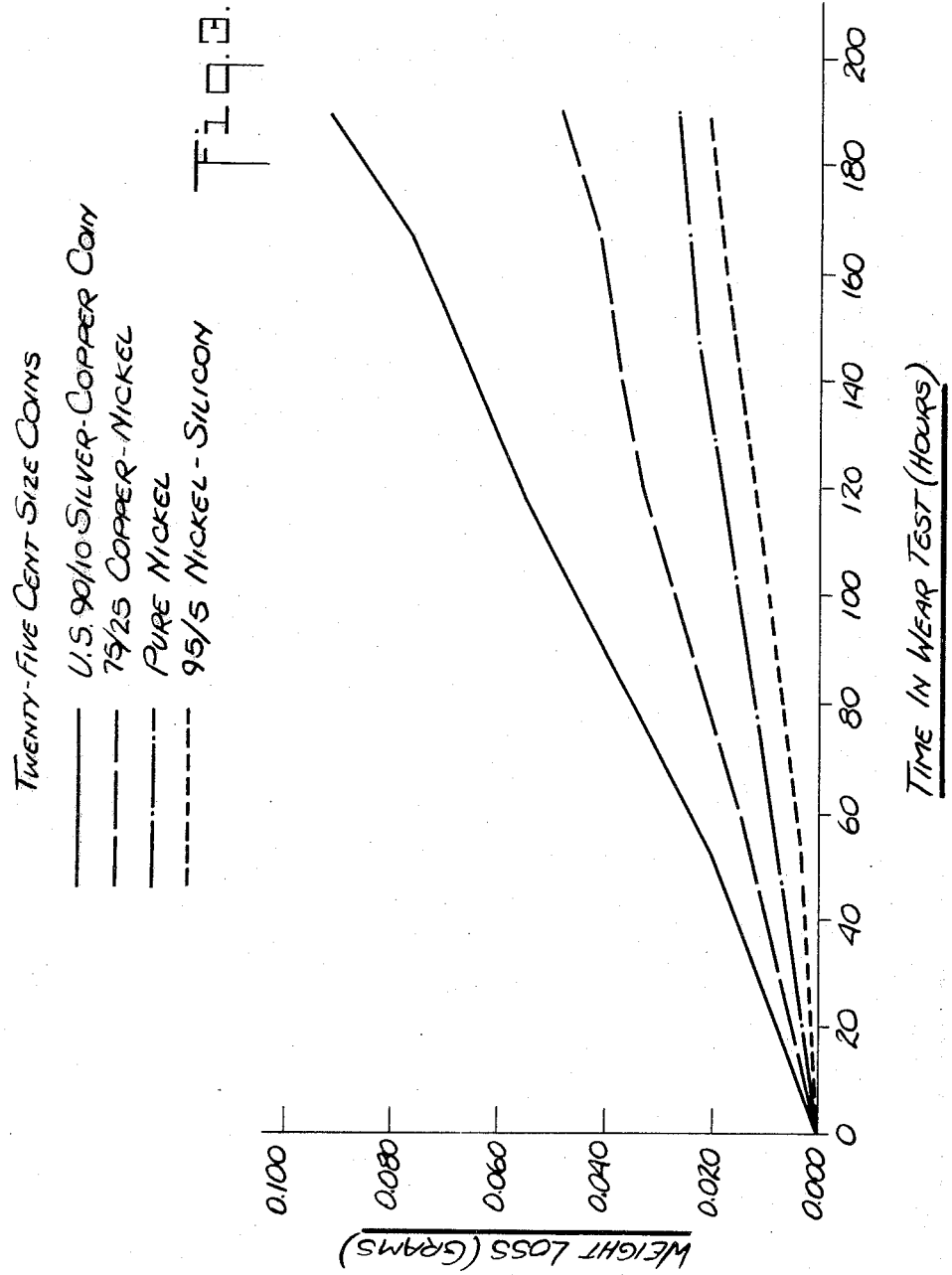

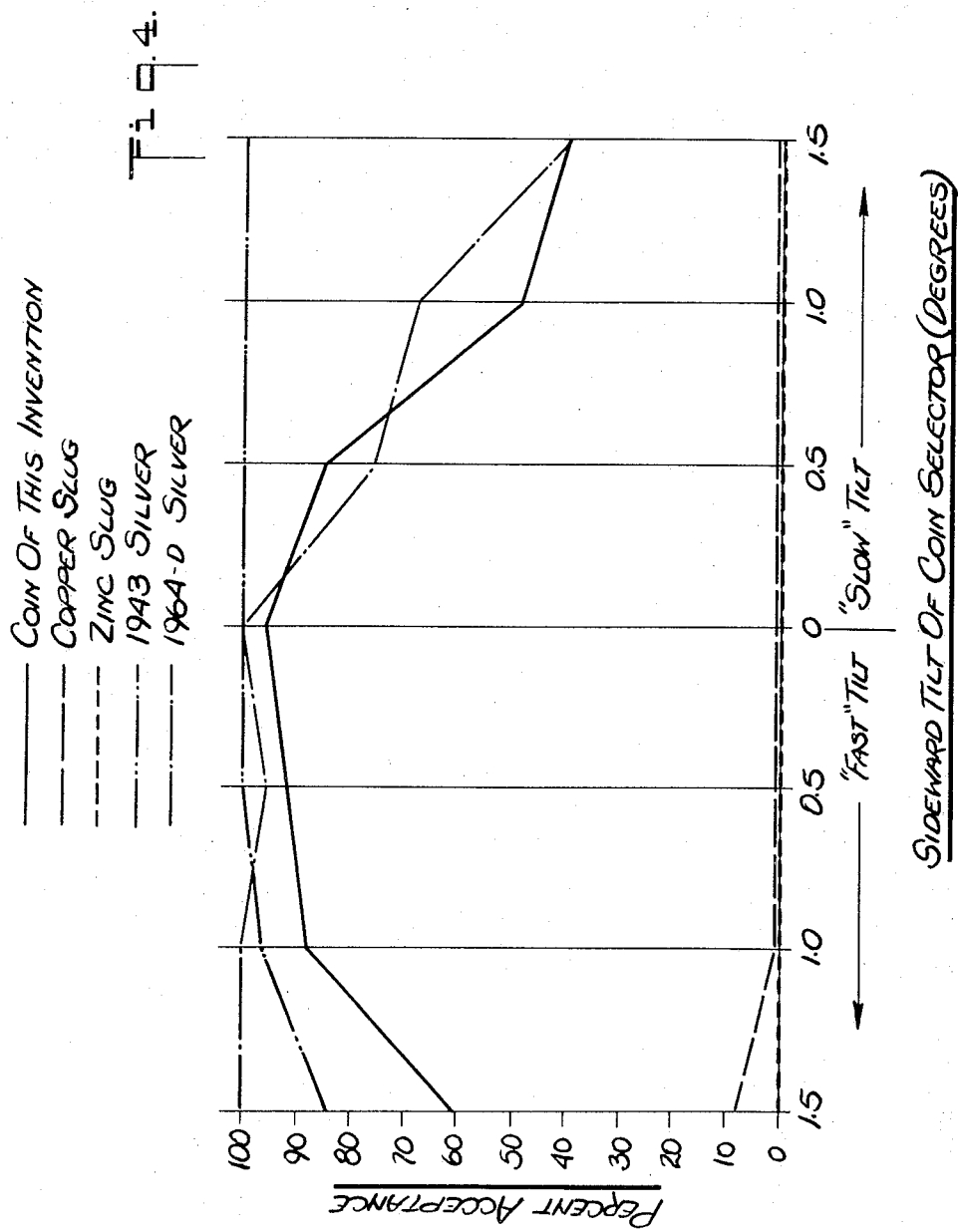

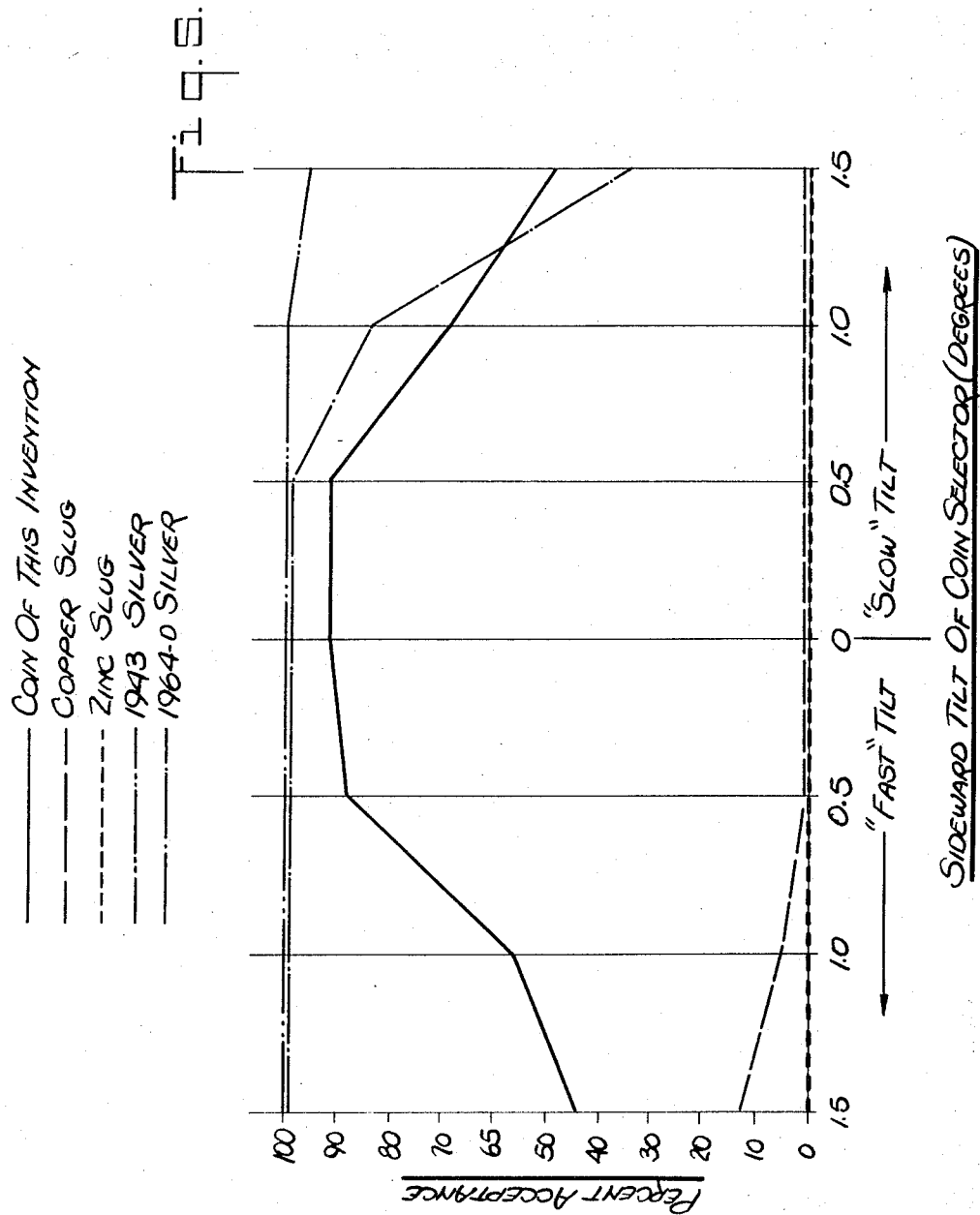

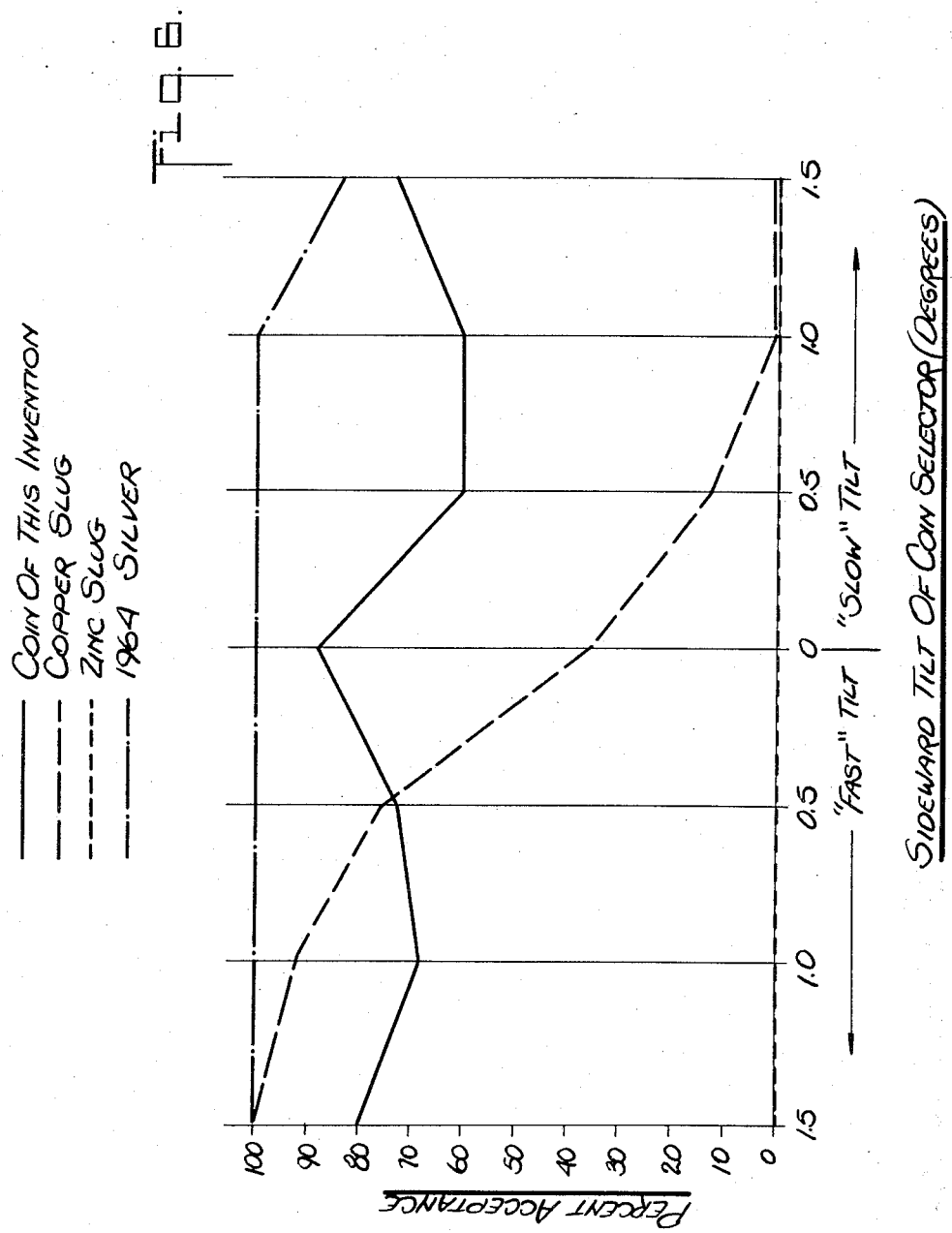

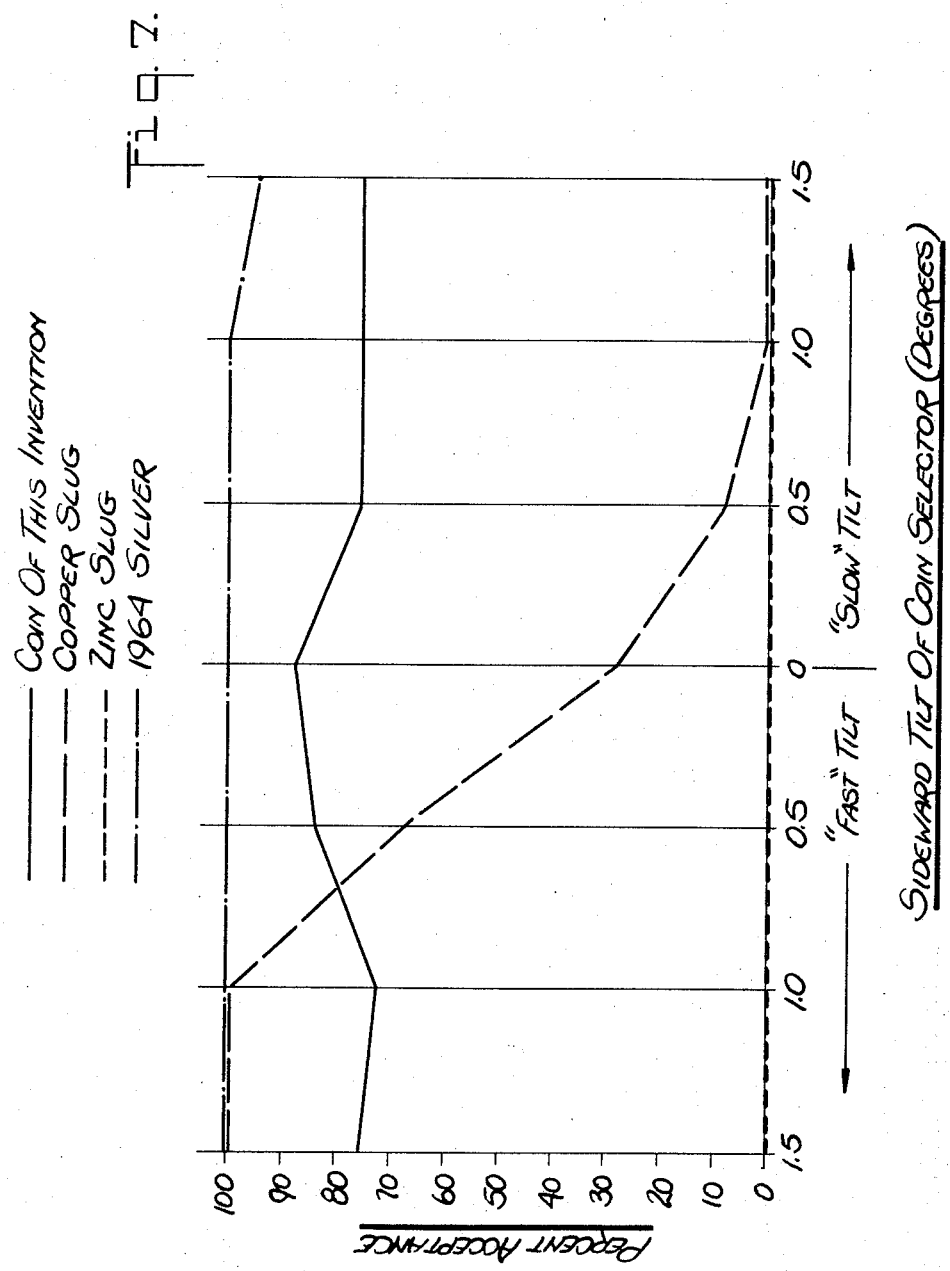

3,368,880
COMPOSITE NICKEL MATERIAL
Pierre Paul Turillon, Ramsey, N.J., Robert Roy Crawford, Suffern, N.Y., and Robert Howard Trapp, deceased, late of Ringwood, N.J., by Gloria Worthington Trapp, executrix, Pittsburgh, Pa., and Francis Laurence La Que, South Orange, N.J., assignors to The International Nickel Company, Inc., New York, N.Y., a corporation of Delaware
Filed May 4, 1965, Ser. No. 453,577
10 Claims. (Cl. 29—183.5)

ABSTRACT OF THE DISCLOSURE

Directed to a composite coinage material having outer layers made of a corrosion resistant and wear resistant alloy such as a nickel alloy containing about 5% silicon and having a central layer of a soft ferromagnetic alloy such as an alloy containing about 16% iron, about 4% molybdenum, and the balance nickel, so as to confer a controlled magnetic permeability to the composite and to provide coins which are interchangeable in sophisticated coin selection devices with silver alloy coinage.

---

The present invention is directed to nickel coinage material and, more particularly, to nickel alloy coinage strip and nickel alloy coins which have a property, unique from all other commercially available or readily producible metals or alloys, which property enables their detection and separation from all other materials by appropriate sensing devices, thereby furnishing a basis for the operation of automatic vending machines and other coin-operated mechanisms, as well as fulfilling the traditional requirements for coinage metals.

Silver has played a most significant role in the history of coinage alloys and has been the major constituent of U.S. coins in denominations of $1.00 or less since the establishment of the U.S. Mint. Silver alloys such as those currently employed in U.S. ten cent, twenty-five cent, half-dollar and dollar coins are eminently satisfactory from many standpoints. By long tradition, these silver coins, which contain about 90% silver and the balance copper, have deservedly gained acceptance by the public. These coins are bright and attractive in appearance and have substantial value.

In addition, since the character of U.S. coinage has not changed over a long period of years, means have evolved through decades of development to readily detect and separate legitimate silver coins from spurious or counterfeit coins or slugs with a high degree of discrimination. This capability which, at the present time, is at a highly advanced state of development, is largely responsible for the phenomenal growth of the vending industry which last year reportedly passed the 3.5 billion dollar business mark. Without these discriminator devices the use of slugs would no doubt quickly stifle the vending industry. It is of interest to note, in this regard, that the growth of the vending industry closely paralleled and followed the development of increasingly discriminating selector devices.

The potential slug hazard which would exist without these selector devices is demonstrated by the magnitude of the losses incurred by the telephone companies through the use of slugs, since most telephone coin boxes in present use test only for size and weight of the deposited coin. During the month of October 1964, an estimated ¾ million slugs were taken in telephone coin boxes in 64 principal U.S. cities alone, which reduces the total annual revenue some two to three million dollars. Here, the only incentive to use a slug is to make a telephone call, whereas in vending machines and coin changers valuable merchandise and real money in change may be obtained.

It is important to note that while the vending industry is sometimes thought of as comprising only the machine owner/operator and manufacturer, many large corporations depend heavily upon vending for the sale of their products and services. These include food packers and producers, tobacco and beverage companies, and manufacturers of laundry, dry-cleaning, and other coin-operated service machines. Thus, wide-scale losses which may be suffered by the "vending industry" directly would also be felt indirectly by a large segment of American business if the safeguards of selector devices became lost or their effectiveness diminished.

Present estimates are that there are in use in the U.S. some 3.5 to 4 million coin selector devices of the most sophisticated and discriminating type for vending merchandise and services. These figures do not include the devices of the same type which are also used in juke boxes and other amusement machines. Nor do they include the numerous coin selectors of varying degrees of lesser sophistication in use in telephone coin boxes (estimated 1.5 million), parking meters, highway toll collectors, and various coin sorting and counting mechanisms in wide use by banks and coin users.

The presently constituted coin selector devices have evolved from and are wholly dependent for their operation upon the constancy and predictability of the characteristics of the silver coinage of the United States and the unique physical properties of that material. Therefore, from these considerations alone, a change in the coinage metal from the traditional silver-copper alloy, which has been in use practically continuously for over 150 years, would have serious and far-reaching consequences.

Nevertheless, due to an ever-increasing industrial consumption of silver and little increase in supply, which is principally a by-product of lead and zinc production, the demand for the metal has now reached an annual level which far exceeds the annual level of silver production. This factor has naturally forced a continual upward revision of market prices for silver until at the present time the market price is almost at the "melting point" with regard to silver coinage; i.e., the value of the silver content in the U.S. silver coinage has now almost reached the point where it would become profitable to melt down the coins for sale as bullion.

In order to prevent the price of silver from exceeding the melting point, the United States Treasury has been releasing to the market silver which has been accumulated by the Government over a period of many years. However, between the factor of the greatly increased demand for silver in many coins and the greatly increased industrial demand for silver, many experts predict that the Treasury's reserve supply of silver will be exhausted in a very short time if it is continually released to the market for the purpose of controlling the price of silver.

The harsh economic facts of the situation have now forced consideration of a substitute material for the silver alloy currently employed in coinage. As a matter of fact, other countries in the world, having been faced with the same supply dilemma, have already discontinued the use of silver in coinage.

Symptoms of a pending crisis are now clearly apparent in the country. For some time there has been an ever-increasing demand for coins, with acute shortages in some areas. To offset this situation, the U.S. Mint is now producing coins at the highest rate in history. Despite the best efforts of the Mint, the coin shortage persists. Exports of silver out of the country have increased sharply in recent months, and hoarding of large quantities of silver coins by collectors and enterprising coin brokers and investors is commonplace. These symptoms have been explained by some as merely natural consequences of the nation's population growth and the increasing use of vending machines which "store" coins until the units are serviced; the shortage of coins caused thereby is said to induce collecting and hoarding which will cease once the shortage has been overcome and the incentives to hoard removed.

Legislation last year to continue the 1964 date on all coins was enacted as a step toward these goals. The increased coin production by the mint and the release of Treasury silver at $1.293 per ounce are also being done in efforts to restore silver coins to circulation. But it seems inevitable, as experiences in other countries that have faced the same issues have shown, that these measures cannot cope with and correct, with any degree of permanence, the basic issue of lack of silver in the world. The present measures will be effective for only as long as there are sufficient Treasury silver reserves to maintain the price of $1.293 per ounce. After that time the price will rise, and the nation's silver coins will be the world's cheapest source of supply of this precious metal, unless steps are taken in the near future to find a substitute material for the present silver coins.

The problem of providing a new coinage material for use in place of currently used silver alloys is complicated by many factors, including the factor of public acceptance of and confidence in any new coinage material. The problem is further compounded by the fact that adoption of a new coinage material in place of currently circulating silver coins could require expenditure of very considerable sums of money if the new coinage material were not interchangeable with the current silver coinage, or at least acceptable to some degree, in coin-operated devices. However, the problem of providing a new coinage material which would have these characteristics is a very complicated one because, as mentioned before, the existing coin-operated vending machines have evolved from basic principles built wholly upon the unique properties of the present coinage material.

Legitimate coins are made to U.S. Mint standards of diameter, thickness, and weight. The metal alloys of legitimate coins, and, of course, other coins as well, have certain measurable qualities such as electrical conductivity, electrical resistivity, thermoelectric generative qualities, magnetic or non-magnetic qualities, specific gravity, and hardness or elasticity.

These various attributes of coins and slugs form the bases for the various comparative tests which a coin selector performs as the coin or slug passes through it to separate slugs and spurious coins from legitimate coins. These tests are performed almost instantaneously. The greater the number of attributes which can be compared and tested within the physical and economic limits of selector design and production, the greater the degree and accuracy of separation.

Not all devices test all attributes. The degree of separation is usually dependent upon the value of the merchandise being dispensed by or obtained from the machine and/or the likelihood of having the machine's change box emptied of legitimate coins by the repeated use of slugs. Most coin-operated devices merely test for size and weight, but there are increasing numbers of the considerably more sophisticated devices that are capable of rejecting essentially all spurious coins, regardless of nearness in size or weight to legitimate coins.

When a coin is deposited in one of the more selective units, it falls first into a two legged, pivoted, delicately balanced cradle which tests the coin for proper diameter and weight. If the coin is too large in diameter, it is stopped between the legs of the cradle and a diameter check-point or boss positioned near the cradle, and it will not continue through the selector. It must be scavenged or swept out by a metal sweep called a wiper blade which is actuated by depressing the coin return lever. On the other hand, if the coin is undersized in diameter, it falls through the legs of the cradle and passes out of the reject opening at the bottom of the unit. If the coin is the proper size, it comes to rest momentarily between the legs of the cradle, which are precisely spaced to perform this diameter test.

If the coin passes the diameter test, it is next tested for weight. If it is of proper weight (or greater than proper weight), the cradle rotates on its pivot and the coin is deposited on an inclined plane or rail placed precisely in relation to the cradle, down which it travels by force of gravity. If the coin is too light (e.g., a plastic or aluminum disc), the cradle will not rotate, and the coin remains in the cradle from which it must be scavenged.

The speed of each coin as it travels down the rail is determined by the weight of the coin and the length and slope of the rail. If the coin is of proper weight, it travels down the rail at a proper speed. If the coin is too heavy or too light, its speed down the rail is either too fast or too slow. This becomes critical as the coin reaches the end of the rail, for its speed and weight determine its momentum as it passes through a magnetic field at the end of the rail. The purpose of the magnetic field is to test the coin for metallic composition.

The magnetic field is generated by a permanent magnet precisely located at the end of the rail and facing either a steel magnetic main plate or, in selectors in which the main plate is made of non-magnetic die-cast material, a magnetic disc or keeper.

If a coin is of proper diameter, weight, and thickness, it reaches the magnetic filed. Legitimate silver-copper alloy coins are non-magnetic; therefore, they will not be stopped by the magnet, as also will occur with slugs made of some other alloys. However, slugs made of iron alloys which are magnetic will adhere to the face of the magnet and must be scavenged or wiped off by the wiper blade, which is operated by the coin return lever.

Most coins and slugs, however, are non-magnetic, yet are affected by passing through the magnetic field. When such coins or slugs pass through the magnetic field, a natural phenomenon occurs; eddy currents (electrical energy) are generated in the coin or slug by the cutting of the magnetic lines of force by the rolling electrical conductor (the coin). The amount of these currents is determined by the electrical resistivity characteristics of the particular alloy of the coin. These eddy currents generate a secondary magnetic field surrounding the coin which field is opposite in direction to that of the field produced by the permanent magnet of the selector. This opposing magnetic field retards the speed of the coin or slug as it rolls down the ramp or rail. Its speed and hence its momentum has been affected; consequently, the trajectory of the coin as it leaves the end of the ramp, which is determined by its momentum and the force of gravity, is affected.

The separation of the coin or slug in the device is dependent upon its arc or trajectory on leaving the ramp.

The path taken by silver coins involves two obstacles, the deflector and separator. The legitimate silver coin leaves the ramp in a trajectory which avoids the deflector and strikes the separator off center so that it passes down and out the legitimate coin opening. If the coin generates a lesser quantity of eddy currents, and a correspondingly smaller opposing magnetic field surrounding it (e.g., brass, lead, zinc, or German silver), there will be less retarding force, and the coin will have too long a trajectory (too "fast") and thus strike the deflector, bounce off it away from the accept slot, and be rejected. If, on the other hand, the coin generates a greater quantity of eddy currents, and a correspondingly larger opposing magnetic field surrounding it (e.g., pure copper), there will be a greater retarding force, and the coin's trajectory will be too short (too "slow") and strike the separator on the wrong side of center, and be rejected.

Selector divcces are fitted to permit adjustments of the positions of the deflector and separator by the factory or installation and/or service personnel. These adjustments are provided primarily to compensate for the normal variations in strength of the magnets and, to a lesesr degree, to accommodate manufacturing variations in the dimensions and tolerances of the mechanical components and to allow for machine wear.

The adjustments are recommended to be made by trial and error using genuine silver coins and slugs of various materials similar in density-resistivity properties to the silver coin alloy.

The deflector is usually set far enough inward to reject zinc slugs (which have slightly more electrical resistance, but are less dense, than silver coins) and yet accept worn silver coins. The separator is set to reject copper slugs (which have slightly less electrical resistance than silver coins) and accept brand new unworn silver coins. These settings are recommended to be such that the capability of the selector to accept silver coins and reject slugs is unaffected by a few degrees of incidental tilt which may be encountered in field installations.

It is obvious that the selector mechanism is an ingenious, unique, and complex coin sorting device which has reached an advanced state of development, and provides a high degree of accuracy and predictability. The designer of these machines has had as his one and ultimate goal to build into the mechanism as foolproof a system as is physically possible to discriminately distinguish the unique density-resistivity combination of the 90% silver-10% copper coinage alloy and to reject coins and slugs of all other alloys and materials.

The excellent electrical conductivity of silver is well known. Only a few metals have similar conductivity. These are copper, aluminum, and gold. The 90–10 silver-copper coinage alloy has an electrical resistivity of about 2.1 microhm centimeter (compared with that of about 1.70 for pure copper and 1.63 for pure silver; gold and aluminum are 2.44 and 2.83, respectively). Considering the resistivity characteristics alone, pure aluminum or gold coins probably would generate approximately the same amount of eddy current at the same ramp speed through the magnetic field described previously; however, the low density of aluminum would produce less rotational momentum and lower speed and cause rejection. Furthermore, an aluminum coin would be rejected in the earlier stages of the rejector devices because of insufficient weight, and its low corrosion resistance, poor ring, and low intrinsic value and appeal would preclude it from consideration. Gold U.S. coins have not been minted since the country left the gold standard. In every case, alloying a pure metal with another increases resistivity. Silver-copper alloys are unique in that their resistivity is relatively constant with variations in alloy content.

Outside of copper alloys, no other alloy system provides the same degree of separation (velocity range for a given range of density-resistivity product) as silver, or even approaches it. Copper alloys are undesirable for use as a replacement for silver because of their unappealing reddish-brown color, relative ease of counterfeiting, availability for use as slugs, and their history of use for only very low denomination coins.

Thus, it becomes apparent that the principal criterion for slug rejection in the devices discussed, that of sorting the legitimate silver coins from other alloys on electrical resistivity considerations, is unique for the silver-copper alloy. Despite painstaking attempts to reproduce the U.S. Mint dimensions accurately, practically all coins except legitimate ones would be rejected by a properly adjusted unit of the type discussed earlier.

It is obvious, therefore, from the foregoing considerations, that the technological advancements in vending machines and development of coin-operated devices and selectors add one other factor to the list of requirements for a modern coinage material, but a seriously more critical one than perhaps any of the others. That is, modern coins must possess a unique property that enables them to be readily separated out from slugs of all other materials, if the economic advantages and higher standard of living afforded by coin-operated product and service dispensing machines are to be continued.

This property must be present along with all the other well known and recognized properties and qualities required for coinage. For example, the material must be reliably and continuously available in ample supply from more than one source at a reasonable price; requirements for coinage should not represent a large fraction of usage of the metal for all purposes; the material must be capable of being processed into coins by a mint; the material must be readily accepted by the public on the basis of tradition, original and retained appearance in terms of feel, ring, weight and color, which should be silvery and uniform throughout, before and after wear; and the coins should be difficult to counterfeit.

Under the present circumstances of immediate concern in the United States, however, it is not sufficient merely that the above requirements be met, even with the added requirement that the material be distinct and unique from all other common or commercially available metals and alloys. In addition to the need for both types of coinage to circulate together until silver is withdrawn from circulation, the urgency and imminence of the coinage transition makes it further mandatory that the replacement coinage operate all existing coin-operated devices, including the highly discriminating eddy current coin selector. There is not time to develop, design, and replace existing units with new devices which will suit some metal or alloy, which has not as yet been chosen; nor is there an immediately apparently source of funds to finance such a massive undertaking.

We have now developed a unique coinage material which will fulfill all the foregoing requirements, as well as enable the continued use of present eddy current coin discrimination and/or slug rejection devices and which presents the possibility of providing new coin-discriminating devices operating upon an improved principle which would be capable of selecting only the new coinage material while rejecting coins made of all other coinage materials.

It is an object of the present invention to provide a new coinage material having good coinability, high resistance to wear and corrosion and optimum interchangeability with silver alloy coinage in coin-operated devices incorporating the magnetic eddy current discriminating principle.

It is a further object of the present invention to provide a unique coinage material which may readily be handled in rolling, punching and embossing equipment adapted for handling silver alloy coinage.

Another object of the present invention is to provide a special coinage material which is interchangeable at a high acceptance rate with silver alloy coinage and which affords the potential of providing an essentially counterfeit-free coin-discriminating device system based upon the magnetic permeability principle.

Other objects and advantages of the invention will become apparent from the following description, taken in conjunction with the accompanying drawing in which:

FIGURE 1 is a graph illustrating B–H characteristics for ferromagnetic materials, FIGURE 2 is a graph illustrating the weight loss of current U.S. silver alloy coinage due to the effects of service wear, FIGURE 3 is a graph illustrating the wear resistance of coinage materials provided in accordance with the invention as compared to current silver alloy coinage, FIGURES 4 and 5 are graphs depicting the coin acceptance response of test coins produced in accordance with the invention to the dimensions of U.S. twenty-five cent coins in two standard slug rejectors of the eddy current type, and FIGURES 6 and 7 are graphs depicting the coin acceptance response of test coins produced in accordance with the invention to the dimensions of U.S. ten cent coins in two standard slug rejectors of the eddy current type.

Generally speaking, the present invention is directed to a composite coinage material and a composite coin having a plurality of layers made of nonmagnetic nickel alloy and at least one layer of a ferromagnetic metal comprising about 0.2% to about 3.0% by volume of the composite coinage material.

The ferromagnetic layer has two functions. The first function is to enable the coins to operate in existing eddy current coin selectors with as high a degree of interchangeability as possible. The second is to provide a property that is unique from all other common or commercially available metals and alloys which will furnish a basis or principle for the development of a highly discriminating coin selection device based upon controlled magnetic permeability of the coin. Such a device is amenable to mass production within economic limits, and can be used to replace the present coin selectors operating upon the eddy current principle when these devices are rendered obsolete by the inevitable withdrawal and disappearance of silver coins from circulation. The requirements imposed upon the special coinage material to accomplish the first function are considerably more stringent than those needed to accomplish the second.

In present slug rejectors operating upon the eddy current principle, coinage materials produced in accordance with the invention are interchangeable on a practical level with silver alloy coinage but in such rejector mechanisms the coinage material produced in accordance with the present invention operates upon a different principle; to wit, acceptance of the special composite coinage material in eddy current rejector mechanisms is dependent upon slight controlled frictional forces developed by actual contact, under the influence of magnetic attraction, between the composite coin and the eddy current-generating magnet located within the device. Because of this factor, it is most advantageous that the layer of ferromagnetic metal be located centrally within the coinage material.

The white nonmagnetic nickel alloy employed in accordance with the invention has a Curie temperature not exceeding about zero degrees Fahrenheit, more advantageously, not exceeding minus 40 degrees Fahrenheit, and may contain up to about 8% vanadium, up to about 18% molybdenum, up to about 11% chromium, up to about 9% titanium, up to about 7% aluminum, up to about 11.0% columbium, up to about 25% manganese and, for example, in the case of austenitic stainless steels, up to about 75% iron. Most advantageously, the white nonmagnetic nickel alloy employed in accordance with the invention is a binary nickel-silicon alloy containing about 4.7% to 5.6% silicon and the balance essentially nickel or a binary copper-nickel alloy containing about 35%, or, more advantageously, from the standpoint of low Curie point, 40% to about 90% copper with the balance essentially nickel.

The nickel-silicon alloy contemplated in accordance with the present invention advantageously contains about 5% to about 5.4% silicon since such alloys are characterized by a Curie temperature not exceeding zero degrees Fahrenheit and by high ductility such that strip made of the material may be readily hot and cold rolled to strip and bent 180° about a radius equal to the thickness of the strip without cracking. In nickel-copper alloys, the most favorable compositions contain between 40% and 75% copper for ease of production, good hot workability and cold workability, and a Curie temperature not exceeding zero degrees Fahrenheit.

As indicated previously, other white nickel-containing and nickel-base alloys and even stainless steels may be employed to produce the outer layers of the special composite coinage material contemplated in accordance with the invention but the essentially binary nickel-silicon and nickel-copper alloys described hereinbefore are most advantageous from many practical aspects. The said other white nickel-base and nickel-containing alloys are attended by practical drawbacks, including workability, reduced bondability to the ferromagnetic alloy, difficultly controllable Curie point and other disadvantages making them less advantageous for purposes of the invention. Examples of other outer layer alloys are set forth in the following Table I:

TABLE I

| Alloy No. | Percent Ni | Percent V | Percent Mo | Percent Ti | Percent Al | Percent Mn | Percent Cb | Percent Fe | Percent Cr |
|---|---|---|---|---|---|---|---|---|---|
| 1 | Bal | | | | | | | | 9 |
| 2 | Bal | 6 | | | | | | | |
| 3 | Bal | | 11.0 | | | | | | |
| 4 | Bal | | | 8.5 | | | | | |
| 5 | Bal | | | | 6.5 | | | | |
| 6 | Bal | | | | | | 9.5 | | |
| 7 | 8 | | | | | | | 74 | 18 |
| 8 | Bal | | | | | 24 | | | |

The centrally located ferromagnetic layer employed in the special composite coinage material is made from one of a class of alloys having a base composition of iron, cobalt or nickel. Most advantageously, for consistency in results and for best control of ferromagnetic properties, an alloy containing two or more of the aforementioned metals is employed. For example, a soft, magnetic alloy (alloy A) containing about 16% iron, about 4% molybdenum, and the balance essentially nickel is satisfactory for most purposes. This alloy has a Curie temperature of about 850° F. and an average permeability of about 50,000 in the fully annealed state. The alloy fulfills a requirement that the ferromagnetic material have a high enough initial permeability to insure that its saturation magnetization plateau is reached well within the 500 to 1500 oersted range of magnet strengths found in selector devices. Another alloy (alloy B) which may be employed contains about 49% cobalt, about 49% iron and about 2% vanadium. This alloy has a Curie temperature of 1710° F. and a permeability of about 2,000 in the fully annealed state. Because of the very high saturation magnetization level characteristic of alloy B, only about one-third as much in volume of alloy B is required to achieve the desired controlled ferromagnetic effect as is the case when alloy A is employed. FIGURE 1 in the drawing illustrates the B–H characteristics of alloys A and B and demonstrates that these alloys achieve a substantially constant level of saturation magnetization at low magnetic field strengths. It is a desideratum that the ferromagnetic alloys have good hot working and cold working characteristics. Alloy A is better in this regard than is alloy B and the small volume percentages of alloy B found to fulfill magnetic permeability requirements as applied in connection with coin selectors operating upon the eddy current principle necessitates precise control of the amount of the alloy in the coin. Generally speaking, the ferromagnetic or soft magnetic alloy contains up to about 60% iron, up to about 5% molybdenum, up to about 5% vanadium, up to about 5% copper, up to about 5% chromium and the balance essentially a metal from the group consisting of nickel and cobalt, with the nickel content being up to about 80%, and the cobalt content being up to about 55%. When nickel is present, it is usually in the range of about 40% to about 80%, and when cobalt is present, it is usually in the range of about 20% to about 50%. Pure nickel, iron and/or cobalt are not satisfactory materials for the ferromagnetic layer since these metals possess magnetic permeability of such a low order that they do not achieve a constant saturation magnetization in magnetic fields having a field strength of about 500 to about 1500 oersteds especially when the metals are in the cold worked condition encountered in an edge rolled and embossed coin.

Other soft magnetic alloys which may be employed to provided the ferromagnetic layer in the special coinage material contemplated in accordance with the invention are set forth in the following Table II:

In preparing the initial composite body by continuous casting, the core of ferromagnetic material is prepared in strip or sheet form and is held between tension rolls to prevent warpage thereof during the casting operation. In preparing the material by ingot casting, the ingot should be of sufficient volume that the layer of ferromagnetic material inserted in the center of the ingot mold is in the form of a sheet having sufficient thickness to avoid warping after coming in contact with the molten nickel alloy. The resulting initial composite body is then reduced to strip by conventional hot working and cold working procedures. Warm working procedures can be employed beneficially in handling composite materials including layers of high permeability alloys having poor cold workability. Some metallic interdiffusion occurs between the metallic materials in the composite during the heating operations employed to provide the special coinage material in the form of bonded strip, but it is found that the requisite metallic identities are maintained during usual commercial processing operations.

In order to give those skilled in the art a more complete understanding of the invention, the following examples are given:

TABLE II

| Alloy No. | Percent Co | Percent Ni | Percent Fe | Percent Si | Percent Cr | Percent Cu |
| --- | --- | --- | --- | --- | --- | --- |
| 9 | | 76 | 18.5 | | 1.5 | 4.0 |
| 10 | | 80 | 20 | | | |
| 11 | | 45 | 55 | | | |
| 12 | | 43 | 54 | 3 | | |
| 13 | 50 | | 50 | | | |

It is known that permeability is that property of a metal which enables it to reach saturation magnetization in a magnetic field and is indicated by the slope of the B–H curve; i.e., permeability is greatest when a maximum (B) for a material is reached at very low values of magnetizing force (H). As applied to the present invention, saturation magnetization ($B_{max}$) should be essentially constant, i.e., should be at a plateau level, throughout the 500 to 1500 oersted magnet field strength range found in eddy current selector devices. The cold working which coins undergo during processing has a disturbing effect upon permeability of soft magnetic materials. It is desirable that the soft magnetic layer have as high a Curie temperature as possible consistent with the requirements pertaining to workability, bondability, permeability and saturation magnetization properties, since materials having a high Curie temperature are affected more slightly in magnetic properties by temperature changes. Iron-cobalt alloys are characterized by high Curie temperatures but, generally speaking, nickel-iron alloys display highest permeability.

The composite coinage materials contemplated in accordance with the invention may be produced in a variety of ways including continuous casting, pack rolling or cold roll-bonding a 3 layer sandwich, coextrusion of a billet of the nickel alloy about the ferromagnetic core, etc. Other common expedients for preparing composite metal products, e.g., explosive bonding, etc., may be employed. It is desirable from the standpoint of repeated acceptance in vending machine coin-discriminating devices that the ferromagnetic core be located as close as possible to the center of the composite coinage material. The aforementioned requirement that the ferromagnetic material be maintained at the center of the composite coinage material is readily achieved by means of compacting, e.g., rolling, an initial composite body of nickel alloy outer layers of substantially equal thickness and having a strip of ferromagnetic material of required thickness located therebetween by conventional hot and/or cold working procedures.

*Example I*

In the production of composite material having outer layers made of the 95/5 nickel-silicon alloy and having the dimensions of quarter (25 cent) denomination coins using a casting process, a book-type ingot mold is prepared with a sheet of a ferromagnetic alloy containing about 80% nickel, about 16% iron and about 4% molybdenum located across the mold equidistant from the two major sides. The thickness of the ferromagnetic alloy is such to provide a volume proportion thereof in the coinage material of about 2.2%. The prepared mold is fitted with a dual pouring spout and a hot top designed to prevent the metal being poured into the mold from striking either the core sheet positioned down the middle of the mold or the sides of the mold. The mold assembly is preheated to about 300° F.

A charge of electrolytic nickel with sufficient nickel oxide to supply 0.1% oxygen by weight of the charge is melted in an air induction furnace. The heat is partially blocked by means of an addition of about 0.1% silicon and skimmed of all dross, slag and oxide. The bath is maintained at just above the melting point to provide a stirring action impelled by induction and sufficient silicon is slowly added to provide a melt containing about 5% silicon. With a melt temperature of 2550° F. the melt is deoxidized with additions of 0.05% aluminum and 0.05% magnesium.

It is to be appreciated that, in common with other nickel alloys, the composition of the special nickel-silicon alloy must be controlled with regard to the detrimental elements lead, sulfur, bismuth, phosphorous, selenium, etc., to as low levels as possible, e.g., below about 0.01% each, with substantially lesser amounts when more than one is present and with a combined maximum of these elements not exceeding about 0.03%.

The deoxidized melt is then poured into the prepared ingot mold at a pouring temperature of about 2550° F. to 2600° F. with the pouring being conducted such that the metal rises evenly within the mold on each side of the core sheet. The resulting ingot casting is stripped from the mold, its surface is conditioned to remove surface irregularities and blemishes, the conditioned ingot is heated to 2000° F. for one hour and is then hot rolled to 0.150 inch thick sheet.

This sheet is then cold rolled to strip having a thickness of 0.064 inch. The cold rolled material is annealed for 15 minutes at 1650° F. in a non-oxidizing atmosphere. The annealed strip is then cold rolled to a finish thickness appropriate for the production of test coins having the dimensions of twenty-five cent coins. The cold rolled strip then has a hardness of about 90 to 100 Rockwell B, and coin blanks are punched therefrom. The blanks are then edge-rolled, annealed, and embossed to provide finished coins.

An embossing pressure of about 90 to 110 tons is sufficient to provide a good sharp impression in a 95/5 nickel-silicon coin having the size of a U.S. twenty-five cent piece. Somewhat lower embossing pressures may be used with the copper-nickel alloys.

The resultant coins are accepted 100% interchangeably with silver alloy coins in all telephone coin boxes, parking meters, highway toll collectors, bank coin-sorting and counting devices and in the numerous coin-operated devices of the lesser sophisticated type, as well as in many coin selectors of the most discriminating and highly advance type operating upon the eddy current principle. In some makes and models of the latter type, however, it is necessary to treat the magnet face with a small piece of adhesive-backed abrasive tape or some such friction-controlling medium to compensate for differences in magnet strength and other factors such as magnet location, surface condition, etc., inherent in the design of some makes and models of these devices. The tape adjusts the trajectory of the magnetic-cored coin after frictional engagement with the eddy current magnet in coin selector devices of the eddy current type to duplicate that of the silver alloy coins without adversely affecting the acceptance of the silver coins or the rejection of slugs.

The nickel alloy containing essentially 5% silicon employed in the composite coin of this example has a density of about 8.5 grams per cubic centimeter, an electrical resistivity of about 35 to 40 microhm-centimeters and a hardness in the annealed condition (1650° F.) of about 60 to 65 Rockwell B. Desirably, to minimize cupping during blanking operations, the alloy is cold worked about 15% to 20% before blanking in which state it has a hardness of about 90 to 100 Rockwell B. The embossed hardness of coins produced from the annealed alloy is about 100 to 105 Rockwell B. This hardness contributes to long wear of the coins in service. The coins have a silvery bright appearance and a high resistance to tarnishing which enables the coins to present a bright surface over a long service period despite the usual tarnishing and corrosive enviroments encountered in use.

*Example II*

Similar results have been obtained by hot pack-rolling a three-layer sandwich of the nickel alloy containing about 5% silicon, balance essentially nickel and ferromagnetic alloy layer. In this method of processing, plates of the nickel alloy are first prepared by conventional melting, casting into ingots, heating to 2000° F. to 2100° F. for about one hour per inch of thickness, and forging or hot rolling to plate of the desired thickness. These nickel alloy plates are then conditioned to remove surface irregularities and blemishes. A sheet of the ferromagnetic alloy having the composition set forth in Example I of the proper thickness is then placed between two of the nickel alloy plates and the sandwich assembly is welded together along the edges using an appropriate welding electrode. A small venting hole is left at one end to allow air trapped between the plates to escape without causing delamination.

The welded assembly is then heated at 2000° F. for about about one hour per inch of thickness and hot rolled to 0.150 inch thickness. The strip is then cold rolled to 0.064 inch thickness for twenty-five cent denomination coins. An anneal is then carried out at 1650° F. for about 15 minutes, after which the strip has a hardness of about 60 to 65 Rockwell B. It is then cold rolled to final blanking thickness appropriate for producing test coins of the twenty-five cent denomination. The thicknesses of the strip before the final anneal are selected so that the final cold rolling operation to blanking thickness produces about a 20% thickness reduction. This provides the optimum level of hardness needed for blanking to prevent cupping of the blanks during the punching operation.

The blanks are then tumbled to remove burrs from the blanking operation, edge-rolled, and annealed at 1650° F. for about 15 minutes in a non-oxidizing atmosphere. Embossing at 90 to 110 tons produces a sharp, well-defined impression and a hardness of 100 to 105 Rockwell B.

*Example III*

While the nickel alloy containing about 5% silicon is advantageously employed in the outer layers of the composite material contemplated in accordance with the present invention, other nickel alloys may be employed in its stead. Foremost among these are nickel-copper alloys. Any essentially binary alloys in the nickel-copper system which have Curie points below about 0° F. (copper contents greater than about 35%) would be suitable; however, as the copper level increases, the alloy loses its brilliance, becomes dull, and its corrosion resistance diminishes. Also, more care is required in processing the coinage strip, since any oxide remaining at the interface of the nickel-copper alloy and the ferromagneitc layer may cause blistering or delamination at the interface during annealing operations. Nevertheless, where it is desired to limit embossing pressures to about 90 tons (for 25 cent coin size) and the appearance and corrosion resistance of the nickel-copper alloys is adequate, these alloys would be suitable for coinage use.

*Example IV*

The essentially binary nickel alloy containing about 5% silicon employed in accordance with the present invention provides a more durable and longer-lasting coinage than the presently used silver-copper alloy. This has been demonstrated by comparing the weight loss of coins of various alloys under conditions of accelerated wear and corrosion.

To obtain the "standard" wear rate for silver coins, which could be used in predicting probable life for coins produced in accordance with the invention, about $700.00 in quarters were obtained and sorted to provide fifty coins of each year from 1934 to 1964. Except for a few years, this was possible. The coins were cleaned and weighed and the mean weight for each year plotted as shown in FIGURE 2 of the drawing against the year the coins were struck. From the slope of the curve in FIGURE 2, the estimated rate of weight loss per year was taken to be about 0.007 gram per year.

The accelerated wear-corrosion test consisted of continuously tumbling about 25 test coins in a baffled ceramic drum having a capacity of about two gallons and containing about 15 pounds of a solid charge comprising keys, pennies, two inch squares of leather, corks, canvas, rough-edge Hastelloy C shot and four liters of a solution of artificial perspiration comprising 40 grams NaCl, 5 grams $Na_2HPO_4$, 4 milliliters lactic acid, and distilled water to make 4 liters of solution (as reported by S. J. Eisler and H. L. Faigen, "Investigation of Synthetic Fingerprint Solutions," Corrosion, NACE, August 1954). The coins were periodically cleaned and weighed.

FIGURE 3 illustrates the weight loss of coins of various alloys, after being subjected to the accelerated wear-corrosion test. The results indicate that after 190 hours the coinage material of the present invention having outer layers made of the 95% nickel-5% silicon alloy has wear resistance about 4½ times better than the present silver coinage, and nearly 2½ times better than 75/25 cupro-nickel (the alloy used in U.S. five-cent pieces), and about 1.5 times better than even pure nickel.

The wear of the silver coins in the 190 hours of test would be equivalent to about 13 years' circulation. The slopes of the curves of FIGURE 3 suggest an even greater difference between the weight losses of silver and the nickel alloy coins with extended time in test beyond the 190 hours. At the 190 hour point in the test, assuming that the simulated wear-corrosion in the test is roughly equivalent to that of in-use wear, the 95% nickel-5% silicon alloy coins suffer a weight loss of only about 1.5 milligrams per year, as compared to 7 milligrams for the present silver-copper alloy coins.

*Example V*

The proportion of ferromagnetic alloy layer to the nickel alloy used in the coin is dependent upon a number of factors, most of which are related only to the immediate need to accommodate the existing eddy current coin selectors. Included among these factors are the type of ferromagnetic alloy selected. For example, to obtain an equivalent velocity retarding effect in coin selectors operating on the eddy current principle, it has been found that only about one-third the volume proportion of alloy B is required as would be if alloy A were used.

Also, the coin denomination is another important factor, since the magnetic circuits in the eddy current coin selectors are not proportional in their velocity retarding effects to the mass and geometry of the coin when frictional retardation is involved, as would appear to be the case in eddy current velocity retardation. Accordingly, a somewhat different proportion of ferromagnetic layer is required for each coin mass and geometry.

Since the frictional force exerted upon the coin is the dominant force in controlling its trajectory in the selector, the area of contact of the coin against the magnet face, as influenced by the coin's rim configuration, becomes a consideration, as well as the distance of the highest point of the embossed image below the rim. If this is at the same height as the rim, it will increase the area of contact and influence the coin's trajectory and acceptance response due to frictional retardation in the coin selector.

These considerations of coin shape and rim configuration, however, may be considered constant, because the proportion of ferromagnetic alloy is selected for a given coin design, including mass, geometry and surface configuration. It is unavoidable that eventually a modified coin design will be required when the coinage material is changed from silver, since mints design and develop coin designs to fit the flow characteristics of a given coin metal or alloy; differences in these characteristics from one alloy to another, quite independent of hardness alone, prevent an efficient use of a die design and configuration, intended for one alloy, on another. Thus, if the coinage material of the present invention is selected as the replacement material for the 90/10 silver-copper alloy, the proportion of ferromagnetic core will be established to be consistent with whatever modifications will be necessary in the coin dies to accommodate the new alloy in mint production.

Notwithstanding these considerations, selector acceptance tests have been made using trial coin dies and test coins of ten cent and twenty-five cent denominations having a range of proportions of ferromagnetic alloy layer to nickel alloy. FIGURES 4 and 5 show the acceptance response in the two predominant selector models of the most advanced designs for 95% nickel-5% silicon twenty-five cent test coins, having a proportion of ferromagnetic layer of alloy A to coin alloy of 2.2%. The eddy current generating magnet in the device for which test results are shown in FIGURE 4 only was covered with an adhesive-backed abrasive tape. The response is given in terms of sideward selector tilt, as is commonly done, along with similar data for legitimate silver coins and slug metals having density-resistivity product values nearest to the 90/10 silver-copper coinage alloy. Data for ten cent test coin denominations are shown in FIGURES 6 and 7 for similar test coins having a 2.0% proportion of ferromagnetic alloy (alloy A). The acceptance rate at zero tilt is over 80% for both denominations and both selectors, demonstrating the adaptability of the coin alloy of the present invention to existing eddy current selector devices of even the most discriminating type.

It will be appreciated from the foregoing discussion that the control of the proportion of ferromagnetic metal employed in the coinage material contemplated in accordance with the present invention is imposed by the temporary requirement that the coinage material be interchangeable with present silver alloy coinage in sophisticated coin selectors of the eddy current type which are designed to test and accept coins having the low resistivity which characterizes silver alloy coinage. With the replacement of silver alloy coinage, a factor which seems inevitable in the light of hard and unchangeable fact, there will no longer be a need for the eddy current principle to be employed in coin selectors and the coin selector art will then be able to advance to a new and higher state. It would then appear that coin selectors based upon a magnetic permeability principle would be developed which could select only coins having the legally set magnetic permeability. In this event, coinage having any required magnetic permeability could be provided in accordance with the present invention merely by adjusting the proportion of soft magnetic metal in the coin to any required amount. This factor would permit ready discrimination between coins having the same dimensions but of different national origin. Thus, each coin-issuing country could employ its own distinctive proportion of ferromagnetic material in its coinage and coin-discriminating devices set to accept such a coinage would reject coins of other nations having a different content of ferromagnetic material. This advantage is important from the seigniorage aspect and would afford ready means, as in national border areas, whereby only national coinage of a particular country would be accepted within the national borders.

Those skilled in the art will recognize that the coinage material provided in accordance with the invention can be produced by powder metallurgical methods including direct rolling of alloy powders to produce strip having the requisite compositions for the various laminae employed in the composite material of the sandwich type followed by bonding of the laminae, direct rolling of mixed alloy powders to produce strip having the ferromagnetic phase distributed therethrough, and other powder metallurgical techniques available to the art. Powder metallurgy techniques make possible the utilization of powdered ferromagnetic materials including permanent magnet metals and ferrites which are not workable in the usual metallurgical sense, since such materials can be distributed through a ductile metal matrix in carrying out the invention. Of course, when such expedients are utilized, due regard must be had for the permeability, coercive force and other magnetic properties of the materials in selecting the proportions thereof to be employed for purposes of this invention.

Those skilled in the art will recognize that, once a coinage material containing a controlled proportion of ferromagnetic material is adopted as a national coinage, coin selectors will be developed to separate such coins from all other coins on the basis of the controlled content of ferromagnetic material therein. Thus, while magnetic permeability has been suggested hereinbefore as an appropriate basis for the design of selector devices, it will be apparent that any other measurable magnetic property of the coinage material stemming from the controlled proportion of ferromagnetic material content thereof could be employed as the basis for selector devices. This highly advantageous property of the coinage material provided in accordance with the invention makes possible the design of whole new families of sensitive coin selector devices. It will also be recognized that the proportion of ferromagnetic material in the special coinage material of the invention as set forth hereinbefore has been described having in view the expected requirement of interchangeability with present U.S. silver alloy coinage. In situations wherein this requirement is found unnecessary, for example, in national coinage systems wherein silver alloy coinage is not employed, the controlled proportion of ferromagnetic material in the coinage material could be increased to as much as 50% or more by volume of the coinage material. It may also be possible that certain of the Heusler ferromagnetic alloys described at pages 328 et seq. of Bozorth, "Ferromagnetism," 1951, could be employed in preparing the coinage material contemplated in accordance with the invention.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. As a new article of manufacture, a composite coinage material having outer layers made of a white alloy having a Curie point not exceeding zero degrees Fahrenheit and consisting essentially of up to about 8% vanadium, up to about 18% molybdenum, up to about 11% chromium, up to about 9% titanium, up to about 7% aluminum, up to about 11% columbium, up to about 25% manganese, up to about 75% iron, up to about 5.6% silicon, up to about 90% copper and the balance essentially nickel and a centrally located layer comprising about 0.2% to about 3% by volume of said material made of a ferromagnetic alloy consisting essentially of up to about 80% nickel, up to about 55% cobalt, up to about 60% iron, up to about 5% molybdenum, up to about 5% vanadium, up to about 5% chromium and up to about 5% copper, said ferromagnetic alloy having a substantially constant level of saturation magnetization at magnetic field strengths of at least about 500 oersteds.

2. As a new article of manufacture a composite coinage material having outer layers made of an alloy containing about 4.7% to about 5.6% silicon, with the balance essentially nickel and a centrally located layer comprising about 0.2% to about 3% by volume of said coinage material of a soft magnetic alloy characterized by a substantially constant level of saturation magnetization at magnetic field strengths of at least about 500 oersteds, said ferromagnetic alloy consisting essentially of up to about 60% iron, up to about 5% vanadium, up to about 5% copper, up to about 5% chromium, and the balance essentially a metal from the group consisting of about 40% to about 80% nickel and about 20% to about 50% cobalt.

3. As a new article of manufacture, a composite coinage material having outer layers made of an alloy containing about 5% to about 5.4% silicon, with the balance essentially nickel and a centrally located layer comprising about 0.2% to about 3% by volume of said coinage material of a soft magnetic alloy having a substantially constant level of saturation magnetization at magnetic field strengths of at least about 500 oersteds, said ferromagnetic alloy consisting essentially of up to about 60% iron, up to about 5% vanadium, up to about 5% copper, up to about 5% chromium, and the balance essentially a metal from the group consisting of about 40% to about 80% nickel and about 20% to about 50% cobalt.

4. As a new article of manufacture, a composite coin having outer layers made of an alloy consisting essentially of about 4.7% to about 5.6% silicon, with the balance essentially nickel and a centrally located layer comprising about 2% by volume of said coin made of a soft magnetic alloy consisting essentially of about 16% iron, about 4% molybdenum, with the balance essentially nickel, said coin being characterized by interchangeability with silver alloy coins having the same dimensions in coin-discriminating devices, by a silvery appearance, by high resistance to tarnishing and wear and by the capability of being discriminated from all other coins using devices designed to detect coin permeability.

5. As a new article of manufacture, a composite coin having outer layers made of an alloy consisting essentially of about 5% silicon, with the balance essentially nickel and a centrally located layer comprising about two-thirds of one percent by volume of said coin made of a soft magnetic alloy consisting essentially of about 49% cobalt, about 49% iron and about 2% vanadium, said coin being characterized by interchangeability with silver alloy coins having the same dimensions in coin-discriminating devices, by a silvery appearance, by high resistance to tarnishing and wear and by the capability of being discriminated from all other coins using devices designed to detect coin permeability.

6. As a new article of manufacture, a composite coin having outer layers made of an alloy consisting essentially of about 40% to about 75% copper with the balance essentially nickel and a centrally located layer comprising about 2% by volume of said coin made of a soft magnetic alloy consisting essentially of about 16% iron, about 4% molybdenum, with the balance essentially nickel, said coin being characterized by interchangeability with silver alloy coins having the same dimensions in coin-discriminating devices, by a silvery appearance, by high resistance to tarnishing and wear and by the capability of being discriminated from all other coins using devices designed to detect coin permeability.

7. As a new article of manufacture, a composite coin having outer layers made of an alloy consisting essentially of about 40% to about 75% copper with the balance essentially nickel and a centrally located layer comprising about two-thirds of one percent by volume of said coin made of a soft magnetic alloy consisting essentially of about 49% cobalt, about 49% iron and about 2% vanadium, said coin being characterized by interchangeability with silver alloy coins having the same dimensions in coin-discriminating devices, by a silvery appearance, by high resistance to tarnishing and wear and by the capability of being discriminated from all other coins using devices designed to detect coin permeability.

8. As a new article of manufacture, a composite coinage material having a plurality of layers made of an alloy having a Curie point not exceeding about zero degrees Fahrenheit selected from the group consisting of nickel-silicon alloys consisting essentially of about 4.7% to about 5.6% silicon with the balance essentially nickel and copper-nickel alloys consisting essentially of about 35% to about 90% copper with the balance essentially nickel and at least one layer comprising about 0.2% to about 3% by volume of said coinage material made of a ferromagnetic alloy consisting essentially of up to about 60% iron, up to about 5% vanadium, up to about 5% copper, up to about 5% chromium and the balance essentially a metal from the group consisting of about 40% to about 80% nickel and about 20% to about 50% cobalt, said ferromagnetic alloy having a substantially constant level of saturation magnetization at magnetic field strengths of at least about 500 oersteds.

9. A composite coin capable of discrimination from other coins on the basis of permeability, said coin consisting essentially of a nonmagnetic alloy phase having a Curie point not in excess of about zero degrees Fahrenheit selected from the group consisting of essentially binary alloys of nickel with up to about 8% vanadium, up to about 18% molybdenum, up to about 11% chromium, up to about 9% titanium, up to about 7% aluminum, up to about 11% columbium, up to about 25% manganese, up to about 5.6% silicon, and up to about 90% copper and austenitic stainless steels and about 0.2% to about 50% by volume of a ferromagnetic phase from the group consisting of alloys consisting essentially of up to about 60% iron, up to about 5% vanadium, up to about 5% copper, up to about 5% chromium and the balance essentially a metal from the group consisting of about 40% to about 80% nickel and about 20% to about 50% cobalt; ferrites; and Heusler alloys; said ferromagnetic phase being characterized by a substantially constant level of saturation magnetization at magnetic field strengths in the range of about 500 to about 1500 oersteds.

10. A composite coin in accordance with claim 9 wherein said ferromagnetic phase is substantially uniformly distributed throughout said nonmagnetic alloy phase.

References Cited
UNITED STATES PATENTS

| | | | |
|---|---|---|---|
| 1,991,747 | 2/1935 | Hogaboom | 29—199 |
| 2,214,002 | 9/1940 | Trainer | 29—196.6 X |
| 3,248,681 | 4/1966 | Reintgen | 29—196.6 X |
| 3,295,936 | 1/1967 | Asano | 29—183.5 |

HYLAND BIZOT, *Primary Examiner.*